March 1, 1932.  D. W. WADSWORTH  1,847,201
PACKING APPARATUS
Filed Oct. 17, 1930
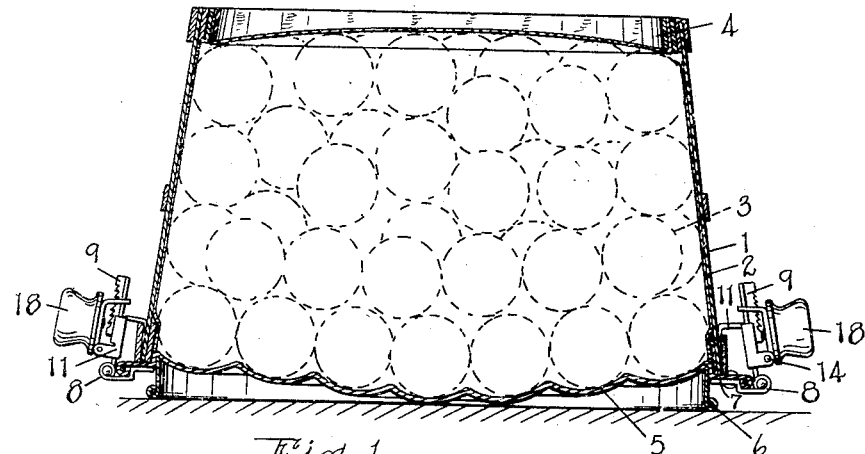
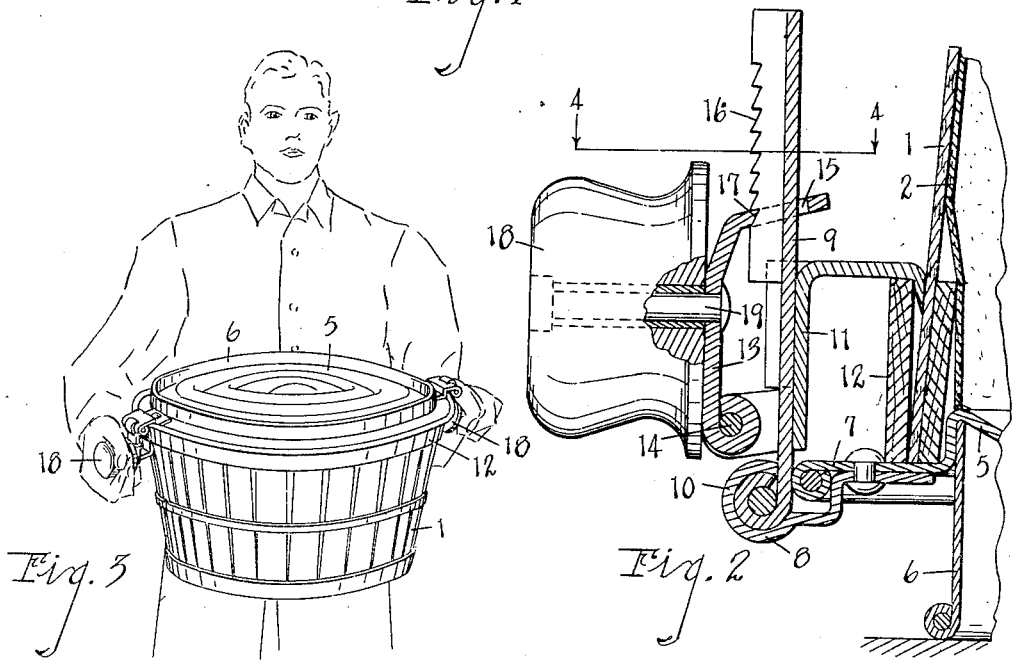
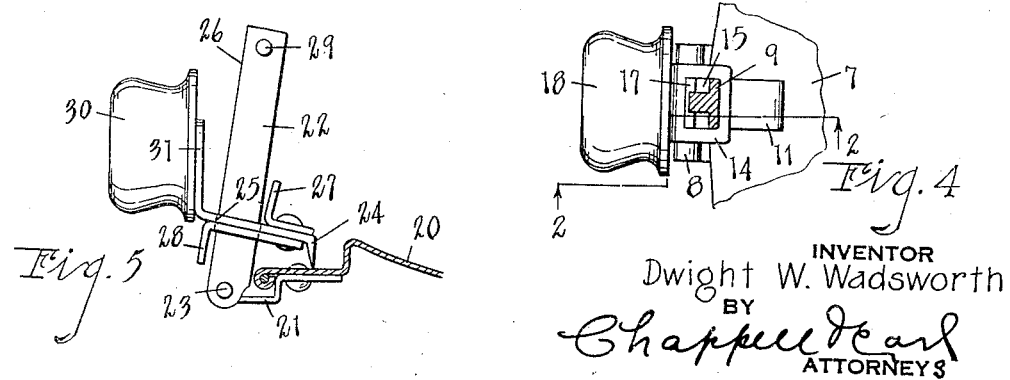
INVENTOR
Dwight W. Wadsworth
BY
Chappell & Earl
ATTORNEYS Patented Mar. 1, 1932

1,847,201

UNITED STATES PATENT OFFICE

DWIGHT W. WADSWORTH, OF FENNVILLE, MICHIGAN

PACKING APPARATUS

Application filed October 17, 1930. Serial No. 489,289.

In the packing of apples and other fruits for the market it is desirable to face the product; that is, arrange the top tier of fruit or vegetables or the like in a regular or uniform manner.

The main objects of this invention are to provide an apparatus for use in packing fruit which enables the "faced packing", minimizes effort and greatly facilitates or expedites the operations.

Objects relating to details and economies of my invention will appear from the description to follow. The invention is defined and pointed out in the claims.

A structure which is a preferred embodiment of my invention is illustrated in the accompanying drawings, in which:

Fig. 1 is a vertical section through an apparatus embodying the features of my invention with a basket or receptacle in position prior to the reversing operation.

Fig. 2 is an enlarged fragmentary view mainly in section on a line corresponding to line 2—2 of Fig. 4.

Fig. 3 is a perspective view illustrating one step in the manipulation of the apparatus.

Fig. 4 is a fragmentary section on line 4—4 of Fig. 2.

Fig. 5 is a fragmentary side view of a modified form of embodiment of my invention.

In the accompanying drawings, 1 represents a basket or receptacle and 2 a liner therefor, the contents being indicated at 3. The receptacle and liner may be of standard type, the receptacles being preferably the straight-side receptacle as illustrated. The bottom 4 of the receptacle may be of the removable type; that is, a bottom which is inserted and secured after the fruit is packed in which case the liner may be employed or not as desired.

My packing apparatus comprises a tray 5 which preferably has a series of annular corrugations adapted to assist in positioning the facing layer of the articles packed. This tray has an annular supporting base 6 and an outwardly facing shoulder 7 for positioning the receptacle.

The tray has oppositely disposed ears 8 to which are pivoted the clamp support members 9, parts 10 of the ears being positioned to limit the pivotal movement of the supports.

Jaws or clamps 11 are slidably mounted on the supports 9 to be engaged with the outer rim 12 of a receptacle arranged on the tray, as is illustrated in Fig. 2.

Clutch members 13 are pivotally mounted on these jaws at 14 and have holes 15 at their outer ends through which the supports are arranged.

The supports have outwardly facing ratchet teeth 16 coacting with the pawl portions 17 of the clutch members so that the jaws are secured in their receptacle engaging position.

Handpieces 18 are rotatably mounted on the spindles 19 carried by the clutches and are so positioned that the weight thereon when the tray is lifted urges the clutches into engaging position.

In the modification shown in Fig. 5, the tray 20 has projecting ears 21 on which the supports 22 are pivotally mounted at 23. The jaw or clutch members 24 are slidably mounted on these supports, the jaws having openings therein to receive the supports, the edge 25 of the opening constituting a clutch coacting with the edge 26 of the support. Stops 27 and 28 limit the rocking movement of the jaw on the support. A pin 29 at the outer end of the support prevents the jaw being entirely withdrawn. The handpiece 30 is rotatably mounted on the arm 31. With the parts thus arranged the manipulation of the apparatus is substantially the same as in the embodiment shown in Fig. 1.

In the use of the apparatus the receptacle is placed in upright position and the facing layer arranged thereon. Where the previously secured type of bottom receptacle is used, a liner 2 is then arranged in position and the fruit poured or otherwise placed in the liner. An open-ended support known to packers as a "tub" is commonly employed to support the liner during the packing operation, this tub not being illustrated. After the fruit is placed in the liner the tub is removed. The receptacle is then arranged over the liner in inverted position, resting upon the tray as shown in Fig. 1, and the clamps adjusted into engagement with the outer rim of the receptacle. This may be accomplished merely by pushing downwardly and inwardly on the handpiece. The tray with the loaded receptacle is then lifted by means of the handpieces, and owing to the position of the handpieces the receptacle swings to upright position as indicated in Fig. 3.

To release the tray, it is only necessary to place the receptacle upon a support and with a slight outward pull, push downwardly on the handpieces which releases the jaws so that the tray can be lifted off the receptacle and again inverted for another operation. The embodiment shown in Fig. 5 permits substantially of the same manipulation.

If the type of receptacle in which the bottom is inserted after filling is employed, the manipulation is the same except that the liner may be omitted and the receptacle is positioned before the fruit or other material is placed therein. The bottom is then inserted and secured and the same manipulations for reversing and releasing the tray are employed.

My improved apparatus greatly facilitates the packing operation, both in the matter of the fruit and labor and effort on the part of the operator, and also in increasing the output.

I have illustrated and described my improvements in embodiments which have proved very practical. I have not attempted to illustrate or describe certain other embodiments or adaptations as it is believed that this disclosure will enable those skilled in the art to embody or adapt the same as may be desired.

Having thus described my invention, what I claim as new and desire to secure by Letters Patent, is:

1. In a packing apparatus, the combination of a facing tray having a receptacle positioning shoulder and oppositely disposed ears, clamp support members mounted on said ears for limited pivotal movement and having outwardly facing ratchet teeth adjacent their outer ends, receptacle engaging clamps slidably mounted on said supports, clutch members pivotally mounted on said clamps at their inner ends and having openings at their outer ends to receive said support members and coact with the teeth thereof, and handpieces mounted on said clutch members.

2. In a packing apparatus, the combination of a facing tray having a receptacle positioning shoulder and oppositely disposed ears, clamp support members pivotally mounted on said ears for limited pivotal movement, receptacle engaging clamps slidably mounted on said supports, clutch members on said clamps coacting with said support members, and handpieces mounted on said clutch members.

3. In a packing apparatus, the combination of a facing tray, oppositely disposed clamp support members mounted on said tray for limited pivotal movement, receptacle engaging clamps slidably mounted on said supports, clutch members pivotally mounted on said clamps to coact with said support members, and handpieces mounted on said clutch members.

4. In a packing apparatus, the combination of a facing tray, oppositely disposed clamp support members mounted on said tray for limited pivotal movement, receptacle engaging clamps slidably mounted on said supports, clutch members on said clamps coacting with said support members, and handpieces mounted on said clutch members.

5. In a packing apparatus, the combination of a facing tray, oppositely disposed clamp support members mounted on said tray for limited pivotal movement, receptacle engaging clamps slidably mounted on said supports, clutch members for said clamps coacting with said support members, and handpieces operatively associated with said clamp and clutch members.

6. In a packing apparatus, the combination of a facing tray provided with a receptacle positioning means, jaw supports pivotally mounted on said tray in opposed relation, receptacle engaging clamps slidably mounted on said supports and provided with clutch members coacting with said supports, and handpieces adjusting said clamps arranged so that the weight upon the handpieces acts to urge the clutch members to engaging position when the tray is lifted by said handpieces.

7. In a packing apparatus, the combination of a facing tray, receptacle engaging clamps mounted on said tray for pivotal and sliding adjustment, means for securing said clamps in their adjusted positions, and handpieces mounted on said clamps for manipulating the clamps and supporting the tray and the receptacle mounted thereon for reversing.

8. In a packing apparatus, the combination of a facing tray, receptacle engaging clamps adjustably mounted on said tray, clutch members for securing said clamps in their adjusted positions, and handpieces mounted on said clamps and operatively associated with said clutch members for manipulating the clamps and supporting the tray and receptacle mounted thereon for reversing.

9. In a packing apparatus, the combination of a facing tray, receptacle engaging clamps mounted on said tray, and handpieces mounted on said clamps for manipulating the clamps and supporting the tray and receptacle mounted thereon for reversing.

10. In a packing apparatus, the combination of a facing tray, receptacle engaging clamps mounted on said tray and provided with means for securing in a receptacle engaging position, and handpieces mounted on said clamps so that the weight upon the tray acts to urge the clamp securing means to engaging position when the tray is lifted by said handpieces.

In witness whereof I have hereunto set my hand.

DWIGHT W. WADSWORTH.